United States Patent
Manasseh et al.

(10) Patent No.: US 10,158,301 B2
(45) Date of Patent: Dec. 18, 2018

(54) SENSORLESS THERMAL PROTECTION FOR POWER TOOLS

(71) Applicant: Black & Decker Inc., New Britain, CT (US)

(72) Inventors: Alexander Manasseh, Cockeysville, MD (US); Mark T. Cherry, White Marsh, MD (US); Wing W. Lin, Bel Air, MD (US); Samuel G. Woods, Bel Air, MD (US); Scott J. Eshleman, Parkville, MD (US); Tal Gottesman, Towson, MD (US); Timothy J. Seeley, Bel Air, MD (US)

(73) Assignee: Black & Decker Inc., New britain, CT (US)

( * ) Notice: Subject to any disclaimer, the term of this patent is extended or adjusted under 35 U.S.C. 154(b) by 0 days.

(21) Appl. No.: 15/431,850

(22) Filed: Feb. 14, 2017

(65) Prior Publication Data

US 2018/0234034 A1 Aug. 16, 2018

(51) Int. Cl.
*H02P 1/08* (2006.01)
*H02P 1/04* (2006.01)
(Continued)

(52) U.S. Cl.
CPC ............... *H02P 1/04* (2013.01); *B23D 45/14* (2013.01); *B25F 5/00* (2013.01); *H02P 1/18* (2013.01);
(Continued)

(58) Field of Classification Search
USPC .................. 388/901, 903, 909, 934, 937
See application file for complete search history.

(56) References Cited

U.S. PATENT DOCUMENTS

| 3,325,657 A | 6/1967 | Corey |
| 3,662,190 A * | 5/1972 | Naber .................. H02K 33/00 |
| | | 227/131 |

(Continued)

FOREIGN PATENT DOCUMENTS

| EP | 1990883 | 11/2008 |
| EP | 2572832 | 3/2013 |

(Continued)

OTHER PUBLICATIONS

Extended EPSR dated Aug. 9, 2018 issued in corresponding EP application No. 18156575.5.

*Primary Examiner* — Bentsu Ro
(74) *Attorney, Agent, or Firm* — Amir Rohani

(57) ABSTRACT

A power tool is provided, including a housing; a brushless DC (BLDC) motor arranged within the housing, the motor including a stator and a rotor rotatably disposed within the stator; a power module electrically disposed between the motor and a power supply, the power module including power switches; an actuator engageable by a user; and a control module configured to control a switching operation of the power switches to begin supply power to the motor when the actuator is engaged. The control module monitors engagement and disengagement events of the actuator, and ignores a subsequent engagement of the actuator if at least one of number of actuator engagement events and/or number of actuator disengagement events exceeds a predetermined threshold value within a predetermined time.

5 Claims, 10 Drawing Sheets

(51) Int. Cl.
*H02P 29/66* (2016.01)
*H02P 3/12* (2006.01)
*H02P 1/18* (2006.01)
*H02P 7/06* (2006.01)
*B23D 45/14* (2006.01)
*B25F 5/00* (2006.01)
*H02P 29/64* (2016.01)

(52) U.S. Cl.
CPC ............. *H02P 3/12* (2013.01); *H02P 7/06* (2013.01); *H02P 29/664* (2016.11); *H02P 29/64* (2016.02)

(56) References Cited

U.S. PATENT DOCUMENTS

| | | | |
|---|---|---|---|
| 3,875,463 A | 4/1975 | Reuter et al. | |
| 4,044,288 A | 8/1977 | Godfrey | |
| 4,079,432 A | 3/1978 | Godfrey | |
| 4,449,161 A * | 5/1984 | Kling | H03K 17/292 227/131 |
| 4,494,162 A | 1/1985 | Eyler | |
| 4,713,718 A | 12/1987 | Quayle | |
| 5,428,197 A * | 6/1995 | McCurry | B25F 5/00 200/302.1 |
| 5,512,810 A * | 4/1996 | Hansen | H02P 25/14 318/800 |
| 5,699,222 A | 12/1997 | Innes | |
| 6,066,931 A | 5/2000 | Morris et al. | |
| 6,628,007 B1 * | 9/2003 | Baumgartner | B60R 21/015 180/282 |
| 6,823,134 B2 * | 11/2004 | Glasgow | H02P 7/04 200/42.01 |
| 7,342,371 B2 | 3/2008 | Zuzuly et al. | |
| 2014/0184397 A1 | 7/2014 | Volpert | |
| 2016/0351039 A1 | 12/2016 | Nishikawa | |

FOREIGN PATENT DOCUMENTS

| | | |
|---|---|---|
| EP | 2852961 | 4/2015 |
| EP | 2884464 | 6/2015 |
| JP | 8191537 | 7/1996 |
| JP | 2007195328 | 8/2007 |

* cited by examiner

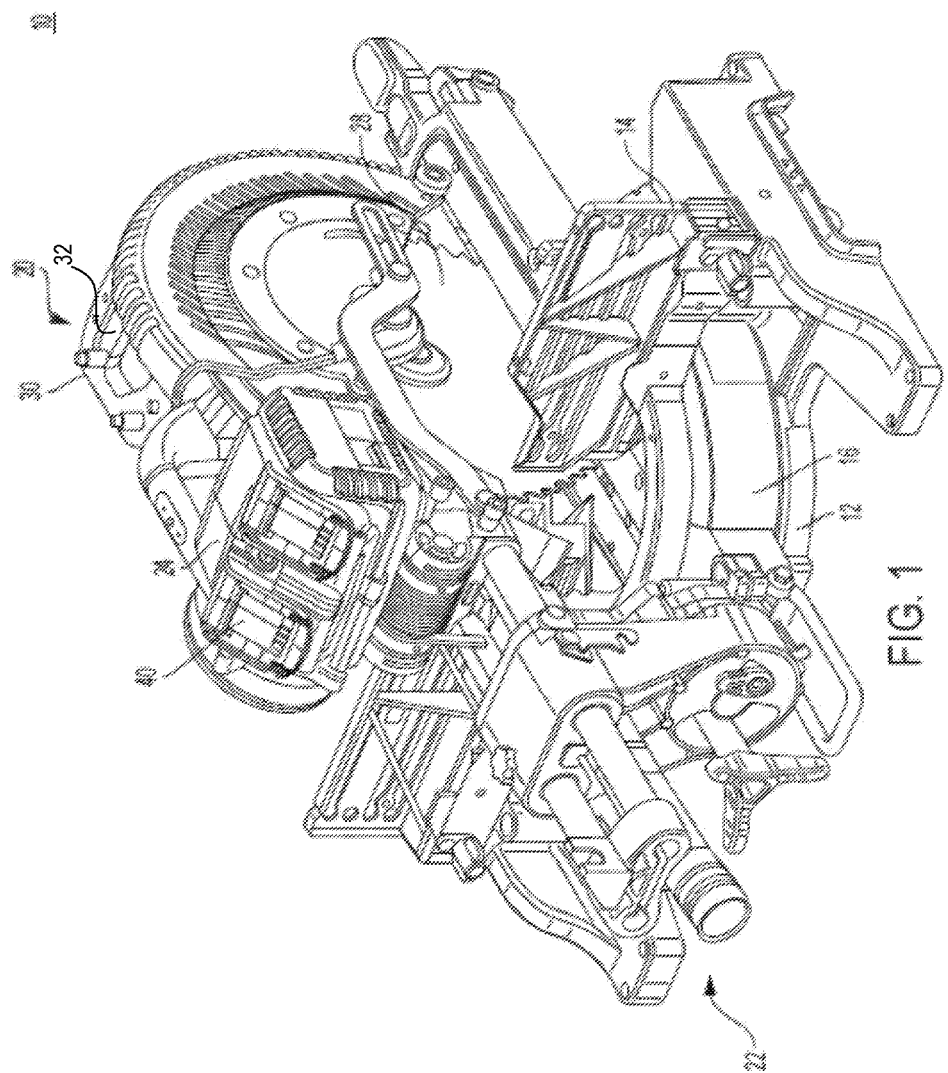

SENSORLESS THERMAL PROTECTION FOR POWER TOOLS

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source while others may be portable and may be powered by a direct current (DC) power source such as a battery pack. In power tools using a brushless DC (BLDC) motor, a series of electronic switches are used to electronically energize motor windings sequentially in order to drive the motor rotor. Using these switches, the speed and rotational direction of the rotor can be controlled.

The switching operation of the electronic switches results in a significant amount of heat. In many power tools, airflow channels are provided to carry heat away from the switches. Heat sinks are also typically provided adjacent the switches for heat dissipation. The heat sinks and air channels are often sized and designed suitable to the power tool's normal usage. However, extraordinary conditions may result in unusual heating of the power switches. It is thus desirable to provide a cost-effective design to safeguard against the power switches overheating when such conditions occur.

SUMMARY

According to an embodiment of the invention, a power tool is provided, including a housing; a brushless DC (BLDC) motor arranged within the housing, the motor including a stator and a rotor rotatably disposed within the stator; a power module electrically disposed between the motor and a power supply, the power module including power switches; an actuator engageable by a user; and a control module configured to control a switching operation of the power switches to begin supply power to the motor when the actuator is engaged. In an embodiment, the control module is configured to monitor engagement and disengagement events of the actuator, and ignore a subsequent engagement of the actuator if at least one of number of actuator engagement events and/or number of actuator disengagement events exceeds a predetermined threshold value within a predetermined time.

In an embodiment, the control module is configured to electronically brake the motor when the actuator is disengaged.

In an embodiment, the power module includes high-side and low-side switches configured as a three-phase inverter circuit.

In an embodiment, the power tool is a miter saw configured to perform a cutting operation.

In an embodiment, the control module is configured to add to a counter upon detection of every engagement and disengagement events of the actuator, and to ignore the subsequent engagement of the actuator if the counter exceeds a predetermined value within the predetermined time.

BRIEF DESCRIPTION OF THE DRAWINGS

The drawings described herein are for illustration purposes only and are not intended to limit the scope of this disclosure in any way.

FIG. 1 depicts an exemplary perspective view of a high-power power tool, according to an embodiment;

DETAILED DESCRIPTION

Figure 2A:
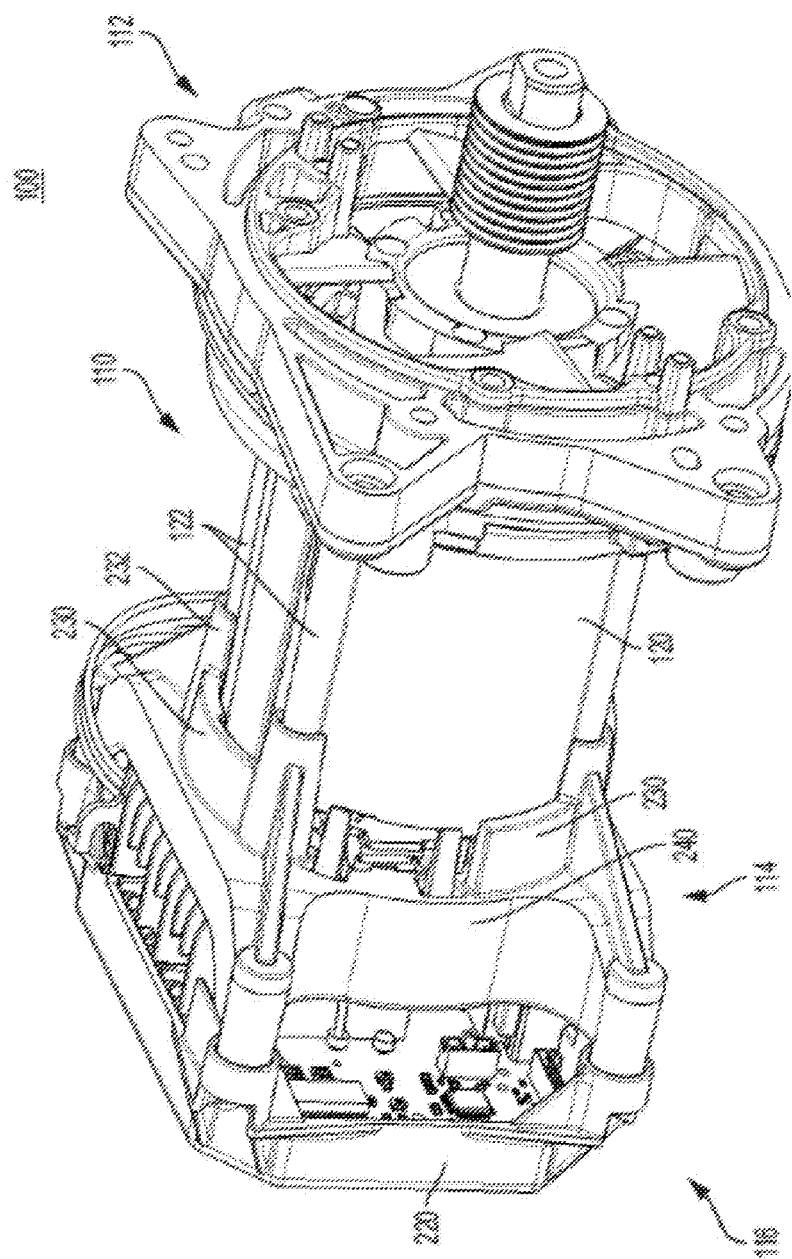
FIGS. 2A and 2B respectively depict a perspective view and an exploded view of a motor assembly including a brushless DC motor and a motor control and power module mounted thereto, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

FIG. 1 depicts an exemplary high-power power tool, in this case a miter saw 10, according to an embodiment. In an embodiment, miter saw 10 has a generally circular base 12 with an attached fence 14, which base supports a rotatable table 16 that is rotatably adjustable for setting the miter angle of the work piece placed on the table 16. A saw blade and motor assembly, indicated generally at 20, is operatively connected to the table 16 by a linear guide mechanism, indicated generally at 22. The saw blade and motor assembly 20 has a tool housing 24 housing an electric motor that is operatively connected through a belt and gear mechanism, not shown but located within a housing portion that drives a saw blade 28. A handle 30 enables an operator to move the blade and motor assembly 20 into and out of engagement with a work piece that may be placed on the table 16 adjacent the fence 14.

In an embodiment, an actuator 32 is disposed within the handle. The actuator 32 may be a trigger switch or other actuation mechanism engageable by a tool user to start and stop operating the power tool 10. As understood by those skilled in the art, the actuator 32 may be a coupled to a contact switch, may be a variable speed switch (e.g., a potentiometer) having an ON/OFF detection mechanism, or may comprise any other arrangement that allows the user to turn the tool on and off.

The miter saw as illustrated in FIG. 1 is illustrative and the teachings of this disclosure may apply to any miter saw, or any other high-power power tool. For more details about an exemplary miter saw, reference is made to U.S. Pat. No. 8,631,734, which is incorporated herein by reference in its entirety.

In an embodiment, the power tool 10 of the present disclosure may include one or more battery receptacles 40. Battery receptacles 40 may receive two battery packs (e.g., two 60V max battery packs, or two 20/60V max battery packs configured in their 60V max configuration) and connect the two battery packs in series for a total of 120 VDC. Alternatively, the battery receptacle may be adapted to receive an adaptor pack that is coupled to an AC power source and provides AC power, through the battery receptacle 40 terminals, to the power tool 10. Details of a high-power DC, or a high-power AC/DC power tool system, including the battery pack and adaptor configurations, is described in PCT Application Publication No. WO 2015/179318, which is incorporated herein by reference in its entirety.

Figure 2B:
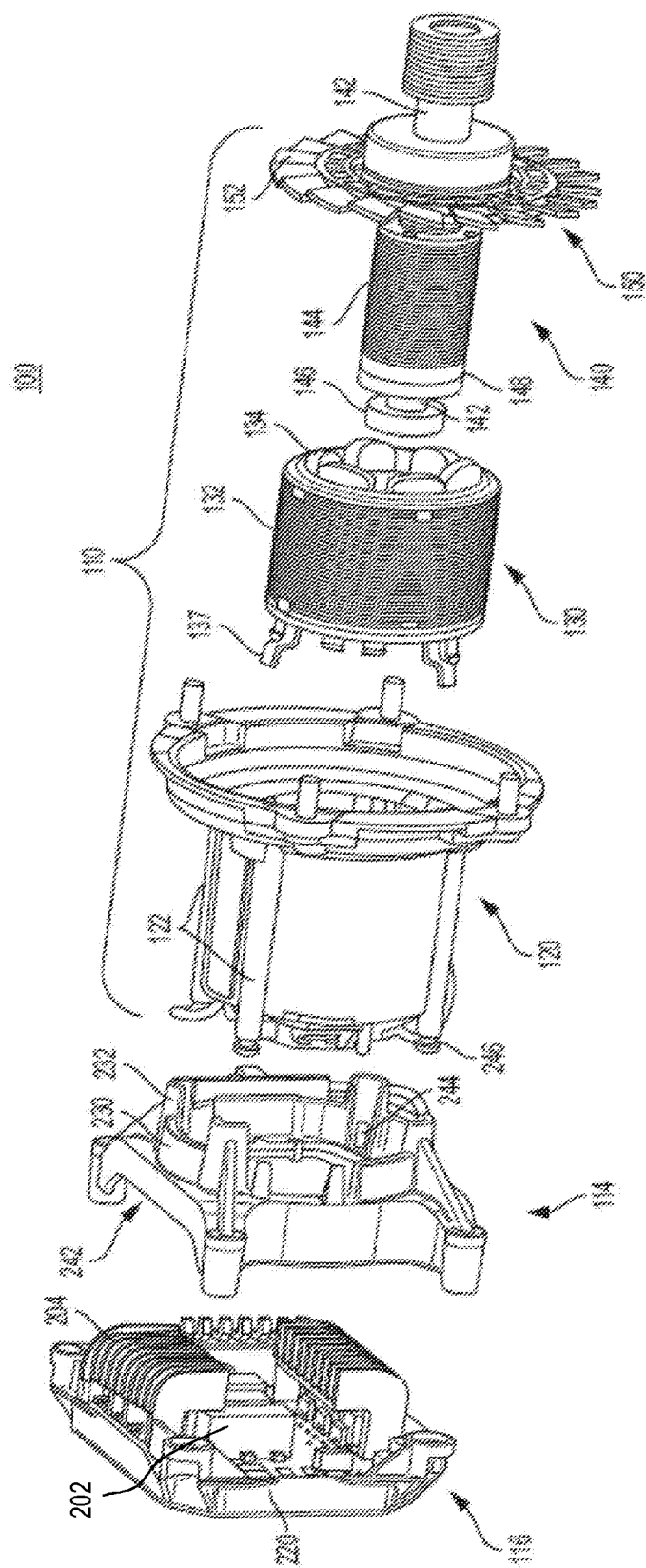

FIG. 2A depicts an exemplary motor assembly 100 according to an embodiment. FIG. 2B depicts the same motor assembly 100 in a perspective exploded view, according to an embodiment.

In an embodiment, motor assembly 100 includes a brushless DC motor 110 having a motor housing 120, a mount 112 attached to one end of the motor 110 for securely attaching the motor 110 inside tool housing 24, a mounting bracket 114 secured on the second end of the motor 110, and control and power module 116 secured to the mounting bracket 114.

In an embodiment, motor 110 is a three-phase brushless DC (BLDC) motor including a stator assembly 130 and a rotor assembly 140 housed within the motor housing 120.

In an embodiment, rotor assembly 140 includes a rotor shaft 142, a rotor lamination stack 144 mounted on and rotatably attached to the rotor shaft 142, a rear bearing 146 arranged at a distal end of the rotor shaft to axially secure the rotor shaft 142 inside a bearing pocket (not shown) of the motor housing 120, a sense magnet ring 148 attached to an end of the rotor lamination stack 144, and fan 150 also mounted on and rotatably attached to the rotor shaft 142.

In an embodiment, the rotor lamination stack 144 may include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 144 or housed therein. The permanent magnets may be, for example, a set of four PMs that magnetically engage with the stator assembly 130 during operation. Adjacent PMs have opposite polarities such that the four PMs have, for example, an N-S-N-S polar arrangement. The rotor shaft 142 is securely fixed to the rotor lamination stack 144.

Rear bearing 146 provides longitudinal support for the rotor 140 assembly. In an embodiment, fan 150 includes a series of blades 152 extending circumferentially to generate air flow through the motor housing 120 as the rotor shaft 142 rotates.

In an embodiment, stator assembly 130 includes a generally cylindrical lamination stack 132 having center bore configured to receive the rotor assembly 140. Lamination stack 132 further includes a plurality of stator teeth around which stator windings 134 are wound. In a three-phase BLDC, windings 134 are coupled in pairs to form three phases of motor 110. Electric energy is supplied to phases of the motor 110 via three input terminals 137 in a controlled fashion, causing the rotor lamination stack 144 to rotate inside the stator lamination stack 132.

In an embodiment, motor housing 120 includes an open end to receive the stator assembly 130 therein. A rear end of the motor housing 120 includes slots (not shown) allowing input terminals 137 of the stator assembly 130 to project outside the rear end of the motor housing 120. Motor housing 120 further includes a bearing pocket (not shown) at its rear end to receive the rear bearing 146, thus securing the rotor assembly 140 inside the stator assembly 130.

In an embodiment, mounting bracket 114 includes a substantially cylindrical portion 230 facing the motor 110 arranged to mate around a circumferential portion of the motor housing 120 at its rear end. The cylindrical portion 230 includes four legs 232 that mate with and slide over corresponding guide rails 122 on the motor housing 120. At distal ends of the legs 232 are disposed four fastening receptacles 244 that allow the mounting bracket 114 to be secured to the end of the motor housing 120 via fasteners 246.

In an embodiment, motor control and power module 116 includes a series of power switches such as insulated-gate bipolar transistors (IGBTs) configured as a three-phase bridge rectifier for driving the motor. The module 116 further includes a heat sink 204 in close proximity to the power switches. The power switches are mounted on a printed circuit board (PCB). Cover 220, together with mounting bracket 114, encapsulate the PCB and the remaining components of motor control and power module 116 at the end of the motor 110.

Figure 3:
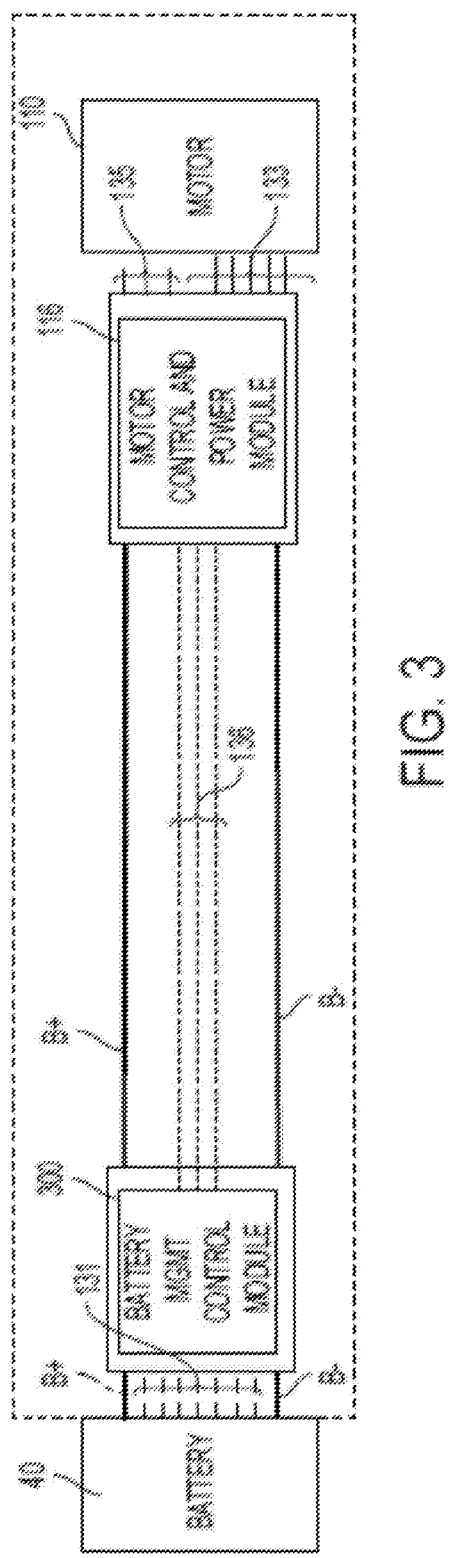
FIG. 3 depicts an exemplary conceptual block diagram of a control scheme for driving a motor within a DC power tool and controlling the operation of the power tool and the tool battery pack, according to an embodiment.

According to an embodiment of the invention, two control modules are provided, as depicted in the simplified block diagram of FIG. 3. In this embodiment, a battery management control module 300 is provided in close proximity to the tool battery receptacle 40. All the battery voltage and battery control wires 131 are provided directly from the battery receptacle 40 to the battery management control module 300. Moreover, in an embodiment, motor control and power module 116 (as described above) is provided in close proximity to the motor 110. As shown in FIG. 2A above, this module 116 may be secured via a mounting bracket 114 to the end of the motor 110 as a part of the motor assembly 100. All motor control wires 133 and motor drive wires 135 arranged between the motor control and power module 116 and the motor 110 are comparatively short. The two modules 116 and 300 communicate via a series of low-voltage signals 136. In this embodiment, the length of the motor control wires 133 and battery control wires 131 is significantly decreased. This reduces the amount of electromagnetic noise on the motor control wires 133 and battery control wires 131, allowing the motor control and power module 116 and battery management control module 300 to receive motor and battery management signals more accurately.

Figure 4:
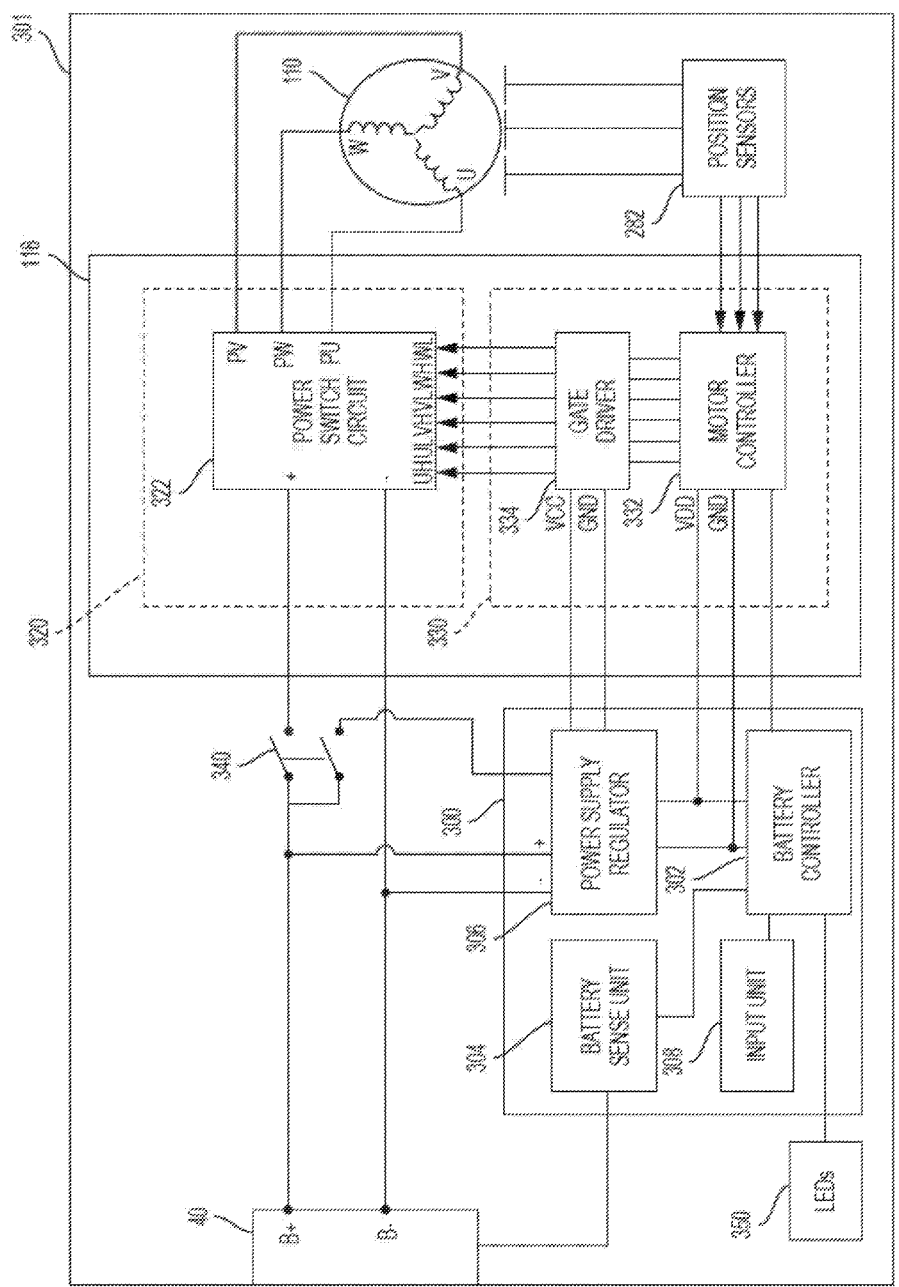
FIG. 4 depicts a block diagram for the battery management control module and the motor control and power module for the power tool, according to an embodiment.

FIG. 4 depicts an exemplary block circuit diagram 301 for a two-controller system of the present disclosure, according to an embodiment.

In an embodiment, motor control and power module 116 includes a power unit 320 and a control unit 330.

In an embodiment, power unit 320 may include a power switch circuit 322 coupled between the power source B+/B− terminals and motor windings to drive BLDC motor 110. In an embodiment, power switch circuit 322 may be a three-phase bridge driver circuit including six controllable semiconductor power switches 202 (e.g. FETs, BJTs, IGBTs, etc).

In an embodiment, control unit 330 may include a controller 332 and a gate driver 334. In an embodiment, controller 332 is a programmable device (e.g., a microcontroller, micro-processor, etc.) arranged to control a switching operation of the power devices in power switching circuit 322. In an embodiment, controller 332 handles all aspect of motor control, including, but not limited to, motor drive and commutation control (including controlling the switching operation of the power switching circuit 322 to control motor speed, forward/reverse drive, phase current limit, start-up control, electronic braking, etc.), motor stall detection (e.g., when motor suddenly decelerates or motor current rapidly rises), motor over-voltage detection and shutdown control, motor or module over-temperature detection and shutdown control, electronic clutching, and other control operations related to the motor.

In an embodiment, controller 332 receives rotor rotational position signals from a set of position sensors 282 provided in close proximity to the motor rotor 140, specifically from the sense magnet ring 148, as will be discussed later in detail. In an embodiment, position sensors 282 may be Hall sensors. It should be noted, however, that other types of positional sensors may be alternatively utilized. It should also be noted that controller 332 may be configured to calculate or detect rotational positional information relating to the motor 110 rotor without any positional sensors (in what is known in the art as sensorless brushless motor control). Based on the rotor rotational position signals from the position sensors 282, controller 332 outputs drive signals UH, VH, WH, UL, VL, and WL through the gate driver 334. Gate driver 334 is provided to output the voltage level needed to drive the gates of the semiconductor switches 202 in order to control a PWM switching operation of the power switch circuit 322.

In an embodiment, battery management control module 300 includes a battery controller 302 that is separate and distinct from the motor controller 332, a battery sense unit 304, a power supply regulator 306, and an input unit 308.

The power supply regulator 306 may include one or more voltage regulators to step down the power supply to a voltage level compatible for operating the two controllers 332 and 302 and/or the gate driver 334. In an embodiment, power supply regulator 306 may include a buck converter and/or a linear regulator to reduce the power voltage from the battery receptacle 40 down to, for example, 15V for powering the gate driver 334, and down to, for example, 3.3V for powering the controllers 302 and 332.

In an embodiment, battery controller 302, similarly to motor controller 332, is programmable device (e.g., a microcontroller, micro-processor, etc.) arranged to control various management aspects of the battery and the power tool. In an embodiment, controller 302 detects when the tool is turned on or off power switch 340 and initiates and/or cuts off supply of power to motor control and power module 116 accordingly. In an embodiment, battery controller accomplishes this by cutting off the supply of power to the motor controller 332 and/or gate driver 334 from the power supply regulator 306. The battery controller 302 may additionally or alternatively receive forward/reverse or trigger on/off signals from an input unit 308 coupled to a trigger switch. The battery controller 302 also receives sense signals of the battery packs via battery sense unit 304, determines if the battery is experiencing a fault condition (e.g., under-voltage, over-current, over-temperature, etc.), and shuts off the supply of power accordingly. In an embodiment, the two controllers 332 and 302 communicate via a serial communication protocol, e.g., Universal Asynchronous Receiver/Transmitter (UART). In an embodiment, battery controller 302 additionally controls other components such as LEDs 350 based on, for example, a state of charge of the battery (not depicted) received within battery receptacle 40.

The above-described embodiment allows for reduced overall wire length, minimizing wiring and routing cost and improving signal integrity of analog signals received by the controllers. Also, the size of the larger bus lines is substantially reduces, e.g., by 2 to 6 inches. These include battery control wires 131, which include a total of seven wires for battery voltage and temperature sensing of the two battery packs; motor control wires 133, which include five wires for hall sensors; and motor drive wires 135, which include three high-current wires. Reducing the size of these wires according to this design minimizes the noise on the motor and battery signals, thus improving system reliability and accuracy.

It is noted that while the circuit diagram of FIG. 4 is designed for a power tool that receives DC power, the principle teachings of this disclosure may similarly be applied to an AC/DC power tool capable of receiving AC or DC power, where the AC power is passed through a rectifier circuit. Examples of such a system are described in PCT Application Publication No. WO 2015/179318 filed May 18, 2015, which is incorporated herein by reference in its entirety.

Figure 5:
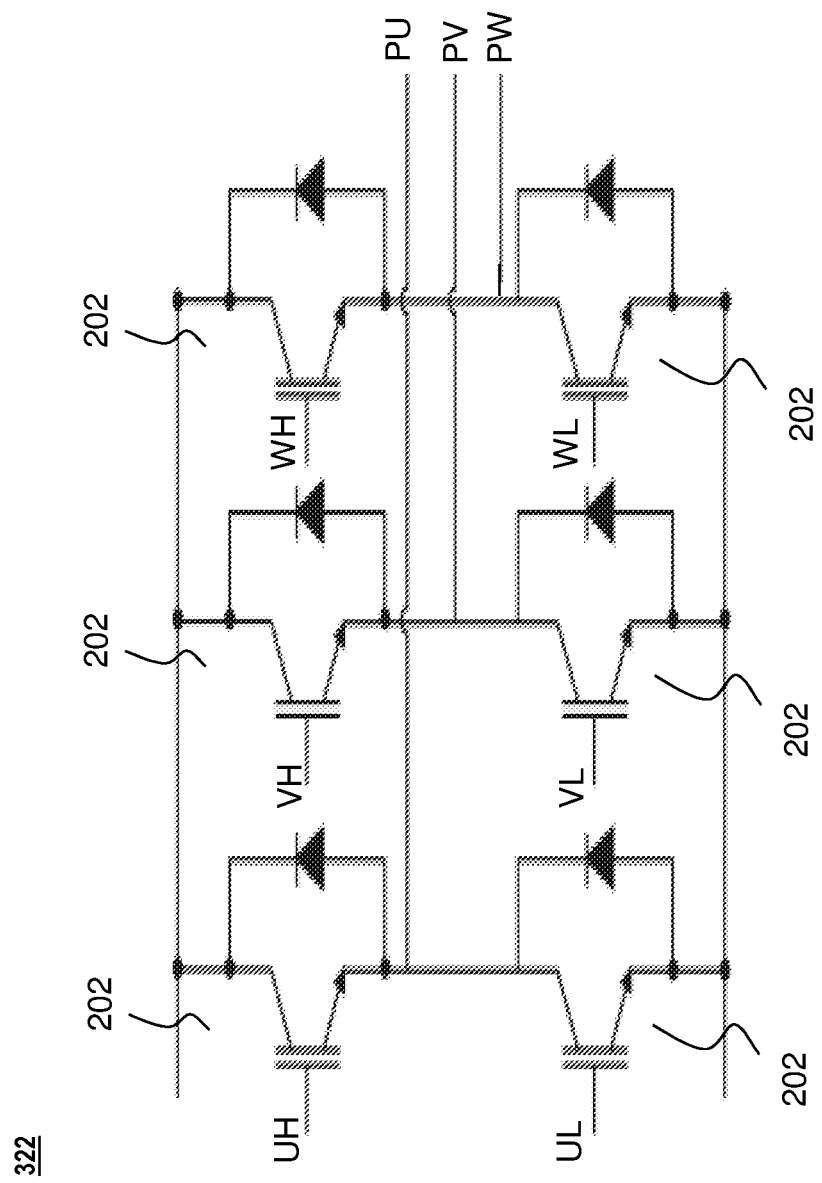
FIG. 5 depicts an exemplary circuit diagram of a three-phase inverter circuit, according to an embodiment.

FIG. 5 depicts an exemplary power switch circuit 322 having a three-phase inverter bridge circuit, according to an embodiment. As shown herein, the three-phase inverter bridge circuit includes three high-side power switches and three low-side power switches. The power switches in this embodiment are Insulated-Gate Bipolar Transistors (IGBTs), although it is understood that other types of power switches such as Field-Effect Transistors (FETs) may alternatively be utilized. In an embodiment, for high power/high voltage applications such as the miter saw of FIG. 1, which is powered by two high voltage battery packs arranged in series, or by an AC power supply in some embodiments, IGBTs may be more suitable. The gates of the high-side switches driven via drive signals UH, VH, and WH, and the gates of the low-side switches are driven via drive signals UL, VL, and WL. In an embodiment, the collectors of the low-side switches are coupled to the emitters of the high-side switches to output power signals PU, PV, and PW for driving the BLDC motor 110.

Figure 6:
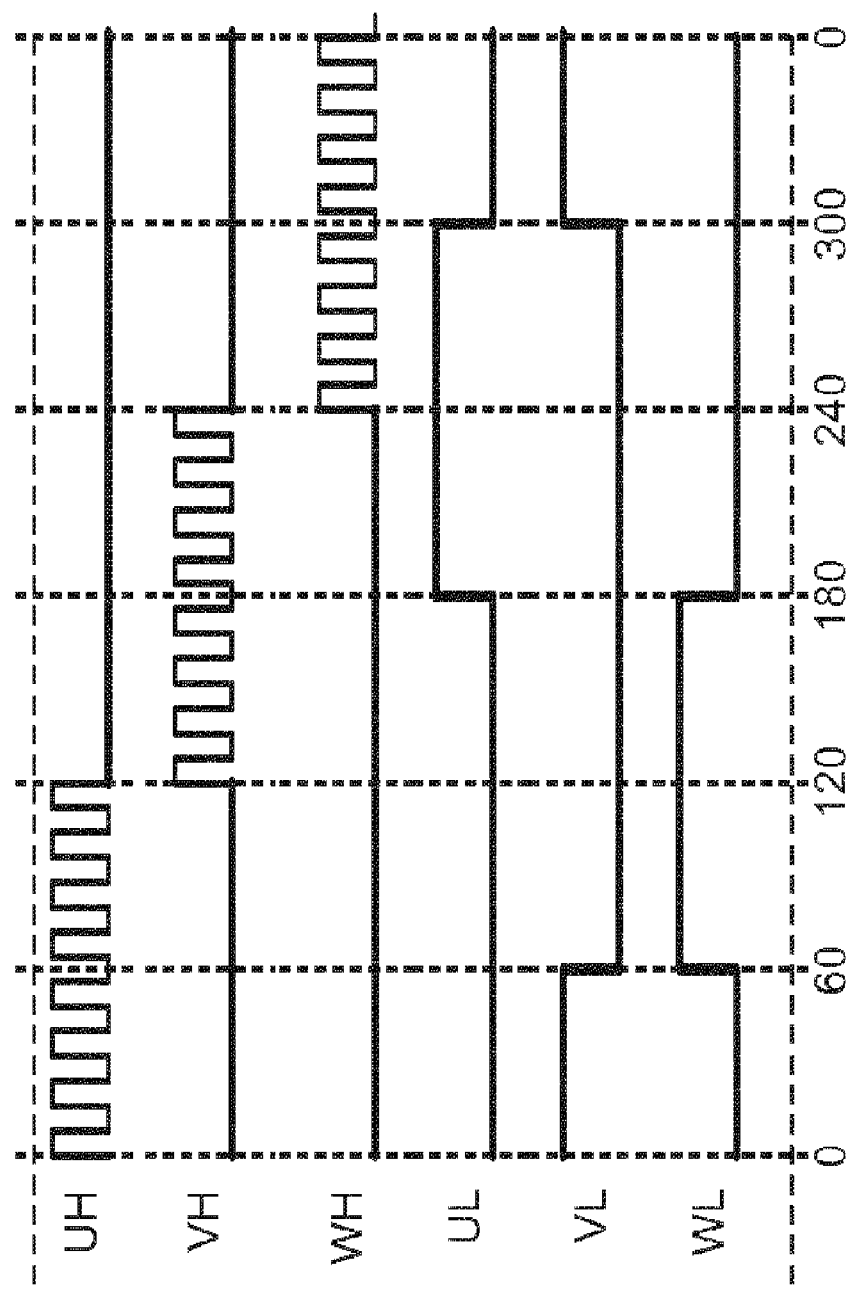
FIG. 6 depicts an exemplary waveform diagram of a pulse-width modulation (PWM) drive sequence of the three-phase inverter bridge, according to an embodiment.

FIG. 6 depicts an exemplary waveform diagram of a pulse-width modulation (PWM) drive sequence of the three-phase inverter bridge circuit of FIG. 5 within a full 360 degree conduction cycle. As shown in this figure, within a full 360° cycle, each of the drive signals associated with the high-side and low-side power switches is activated during a 120° conduction band ("CB"). In this manner, each associated phase of the BLDC 110 motor is energized within a 120° CB by a pulse-width modulated voltage waveform that is controlled by the motor controller 332 as a function of the desired motor 110 rotational speed. For each phase, the high-side switch is pulse-width modulated by the controller 332 within a 120° CB. During the CB of the high-side switch, the corresponding low-side switch is kept low, but one of the other low-side switches is kept high to provide a current path between the power supply and the motor windings. The controller 332 controls the amount of voltage provided to the motor, and thus the speed of the motor, via PWM control of the high-side switches.

Figure 7:
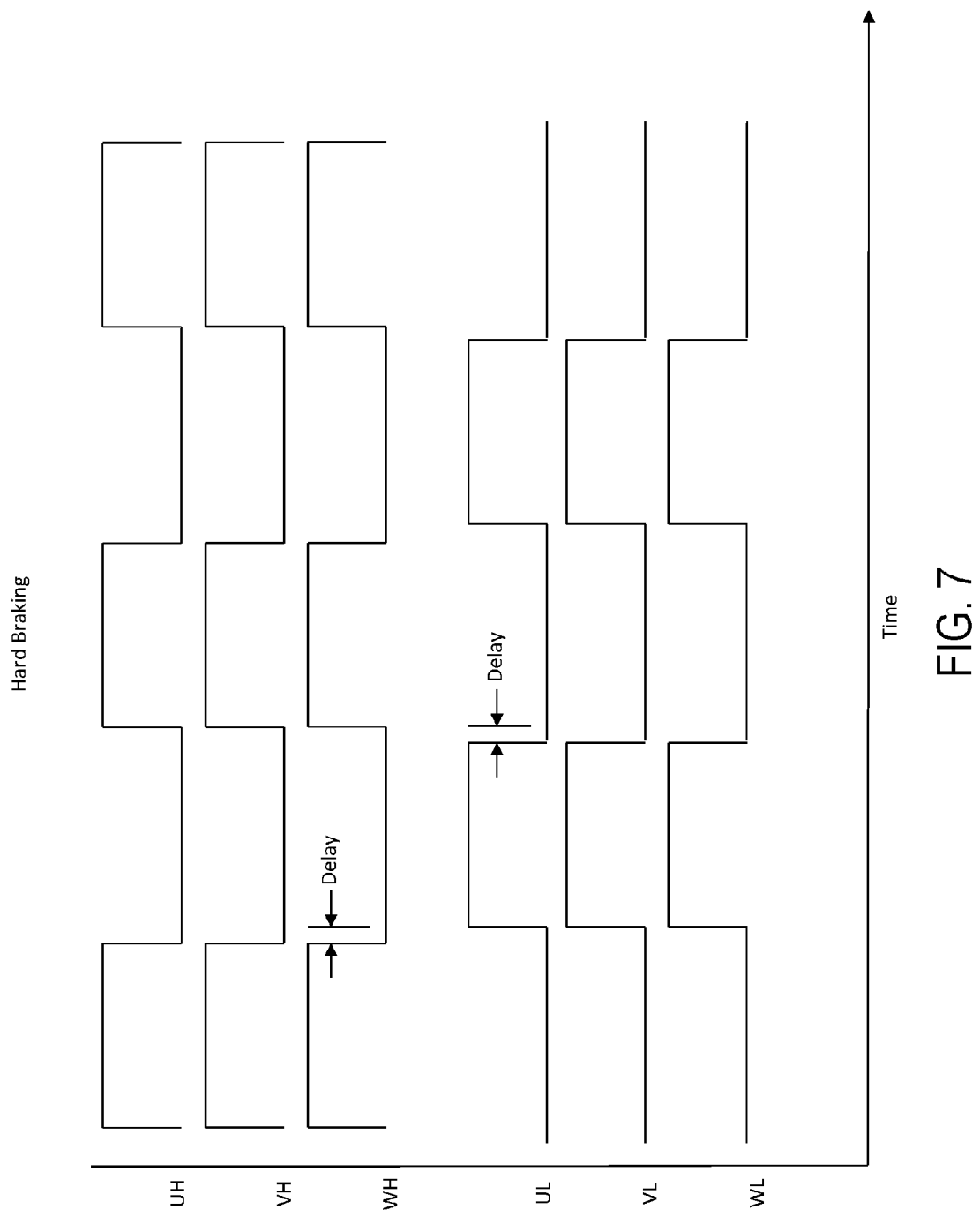
FIG. 7 depicts a waveform diagram for an electronically braking scheme, according to an embodiment.

FIG. 7 depicts a waveform diagram of an electronically braking scheme, according to an embodiment. A brake may be executed upon detection of a fault condition, such as a rotor stall or pinch, to stop the rotation of the rotor abruptly rather than allow the rotor to coast down to a stop. A brake may also be executed when the user releases the tool actuator 32. In this scheme, the controller simultaneously turns on the three high-side or low-side power switches to short the corresponding motor windings. This allows the voltage generated by the back-EMF (electro-magnetic force) of the motor to apply a braking force to the rotor and bring it to a quick stop. In this embodiment, the controller 332 may alternatively turn the high-side and low-side power switches ON (i.e., simultaneously turning the high-side switches ON for a given period, followed by simultaneously turning the low-side switches ON for a given period) in order to distribute the braking current between the low-side and high-side switches. A small delay period is introduced between the high-side and low-side braking cycles to ensure there is no shoot-through of one high-side switch and one low-side switch of the same leg.

In an embodiment, during normal tool run-time, even under heavy load and stressful conditions, the cooling fan 150 generates sufficient airflow to cool the high-side and low-side power switches at temperatures below specification thresholds. For example, for a high-power power tool such as a miter saw operating at a nominal voltage of approximately 100-120V and having an IGBT inverter circuit, the temperature of the IGBTs should not exceed approximately 90 degrees C. Higher temperatures may damage the power switches, resulting in catastrophic tool malfunction. The fan and associated air pathways are normally designed to keep the temperature of the power switches well below the temperature threshold with normal operation of the power tool.

It was found by the inventors of this application that, in an embodiment, the inverter circuit power switches 202 are most likely to heat up during tool start-up, i.e., when the user pulls the actuator 32 from its initial default position, and tool stoppage, i.e., when the user releases the actuator 32. There are several factors that contribute to this temperature increase.

At tool start-up, a large amount of current is required to bring the motor 110 to its desired speed. This in-rush of current flowing through the inverter power switches results in significant heat in the power switches. Similarly, upon the user releasing the actuator 32, as described above, the controller executes electronic braking by shorting the motor windings using the high-side and/or low-side power switches. The flow of back-EMF current through the power switches also results in significant amount of heat, in some embodiments even more heat than caused at tool start-up. In an embodiment, current flow through the power switches during tool start-up and braking can exceed stead state current consumption by a factor or three or more.

Moreover, at both start-up and tool stoppage, the motor fan does not rotate at its full speed, and thus does not generate nearly enough airflow to cool the power switches. In other words, during start-up and braking, the power switches sustain heavy thermal stress without the benefit of fan cooling. When the user engages and disengages the actuator 32 frequently, for example, during successive and frequent cutting operations of a miter saw—where the user may pull the miter saw trigger switch, perform a cutting operation, and release the trigger switch for each cutting operation—the temperature of the power switches may reach and even exceed their operating threshold rapidly.

Conventionally, a single thermistor may be placed in close proximity to the power switches (e.g., mounted on the same printed circuit board as the power switches) to monitor the temperature of the power switches and other components. It was found by the inventors that a single conventional thermistor is not sufficiently responsive to rapid temperature increases resulting from frequent and successive engagement and disengagement of the actuator 32 as described above.

Figure 8:
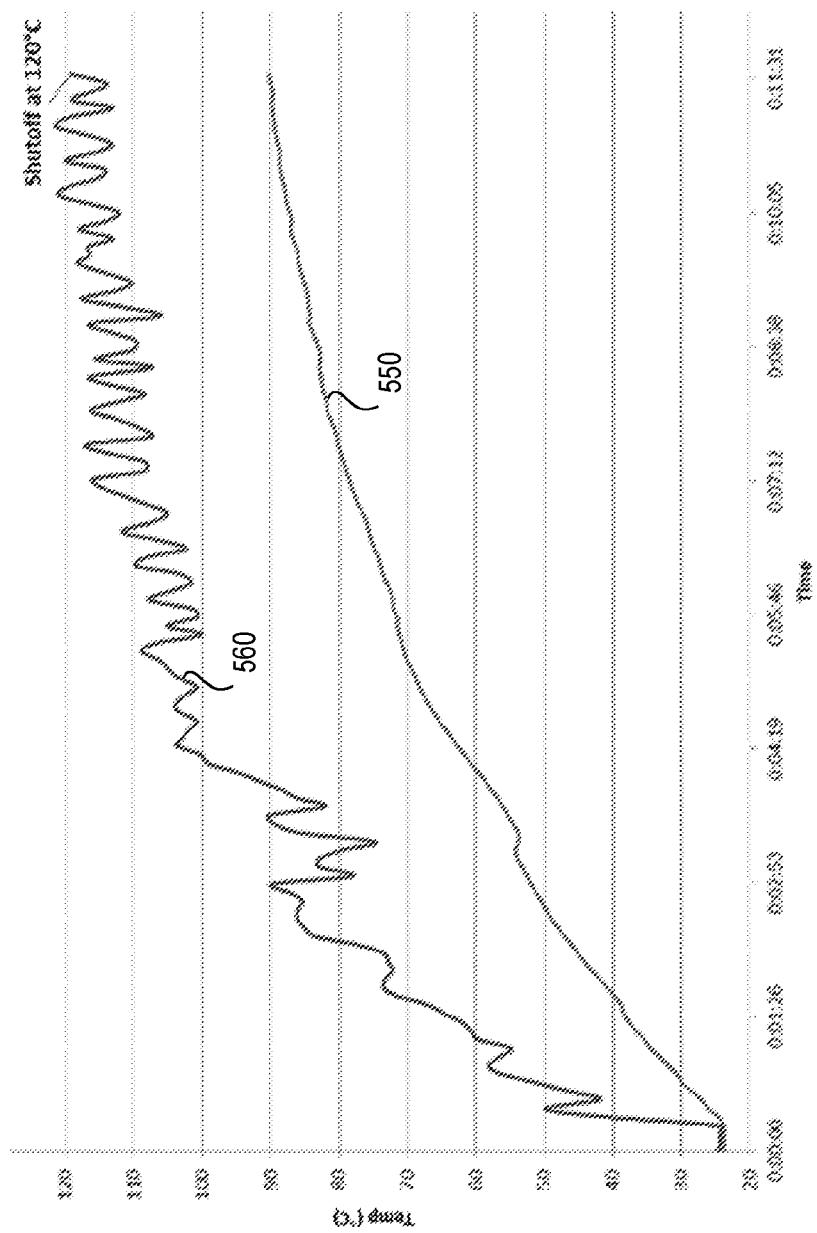
FIG. 8 depicts a diagram of the actual temperature of the power switches v. temperature as sensed by a conventional thermistor, according to an embodiment.

FIG. 8 is an exemplary diagram associated with a miter saw having a single thermistor, depicting temperature of the power switch circuit 322 as measured by the thermistor, designated as numeral reference 550, vs. temperature directly measured at one of the six power switches 202, designated as numeral reference 560, according to an embodiment. In this exemplary test-run, the power tool tested is a miter saw, with cutting operations performed every 5 seconds, i.e., the start-stop cycle beginning with the user pressing the actuator and ending with the user releasing the actuator occurs every 5 seconds. The tool maximum temperature threshold in this embodiment is 90 degree C. As shown, the single thermistor is not sufficiently responsive to the rapid temperature increase resulting from the frequent start-stop cycles. The power switch temperature 560 exceeds the 90 degree C. temperature threshold after approximately 4 minutes of use, but the thermistor fails to respond quickly and reaches the 90 degree temperature threshold after approximately 11 minutes of use. By this time, the power switch temperature 560 has reached approximately 120 degrees C., and has been overheating for approximately 9 minutes.

A solution to this problem is to use dedicated and most expensive thermistors with a better response time to each of the six power switches 202. Such thermistors are not cost-effective for power tool applications, and use of six dedicated thermistors occupies too much space.

Figure 9:
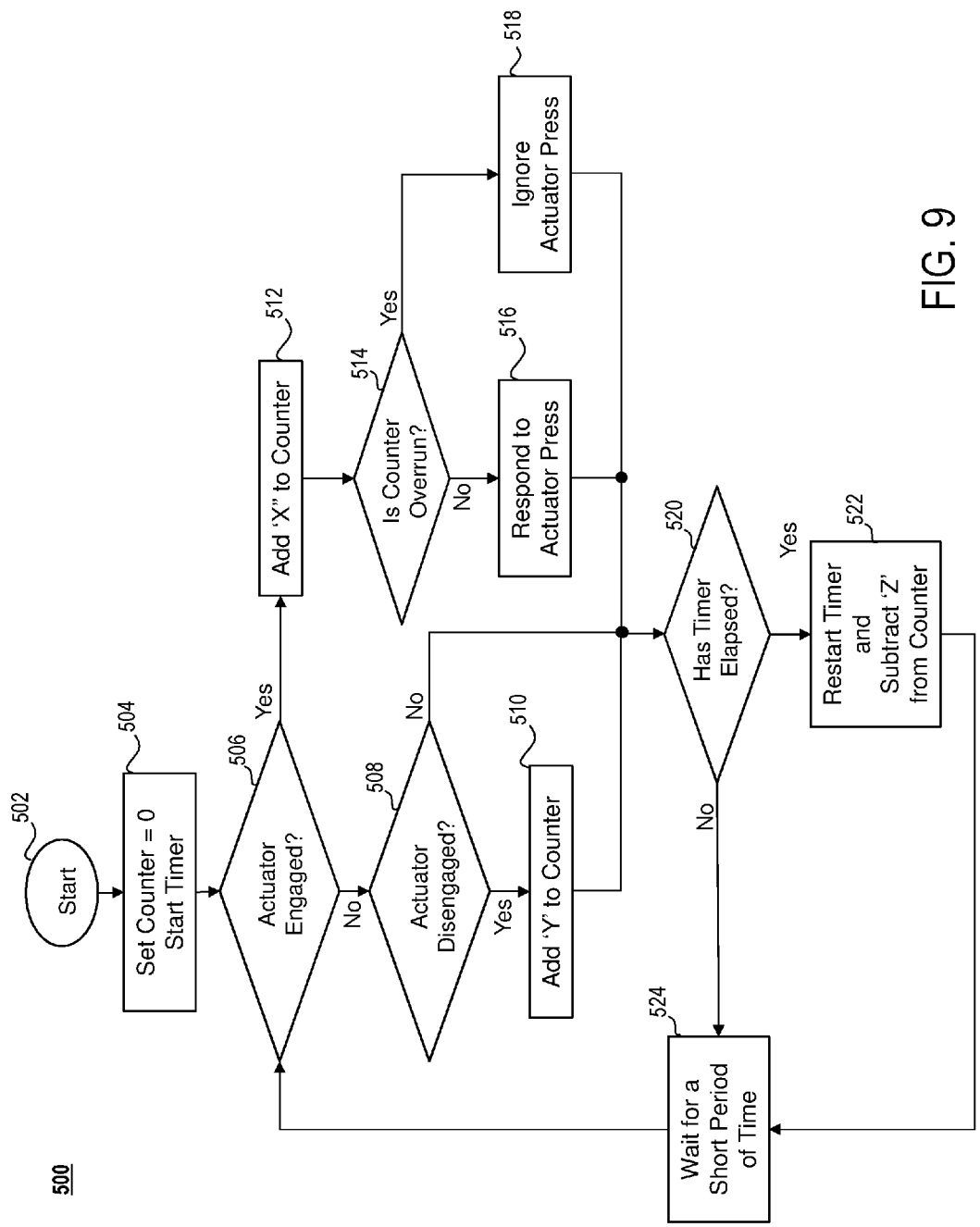
FIG. 9 depicts an exemplary process flow diagram for a control scheme to prevent overheat of the three-phase inverter switches.

FIG. 9 depicts an exemplary process 500 flow diagram for thermal protection of the power switches 202 without use of dedicated and expensive temperature sensors, according to an embodiment. In an embodiment, process 500 may be executed via motor controller 332 or any programmable controller or processor within the power tool.

In an embodiment, process 500 starts at 502 and proceeds to 504, where a counter is set to 0 and a timer is started. Then, the process 500 proceeds to determine at 506 whether the actuator has been engaged and pressed by the user. If not, it proceeds to determine at 508 whether the actuator has been disengaged and released by the user. In the event of an actuator release, the counter is increased by "Y" at 510. In the event of an actuator press, the counter is increased by "X" at 512, and thereafter a determination is made as to whether the counter exceeds a predetermined threshold at 514. If so, the controller 332 responds to the actuator being pressed at 516, and begins operating the motor 110. Otherwise, the controller 332 ignores the actuator being pressed at 518. This ensures that the controller 332 does not begin operating the motor 110 if there have been too many occurrences of actuator engagement and/or disengagement by the user. It is noted that the actuator engaged and actuator disengaged checks at steps 506 and 508 in this embodiment do not refer to the state of the actuator, but rather to the act of engaging or disengaging the actuator. The counter is only incremented by "X" or "Y" when there is a change of state of the actuator.

In an embodiment, the process follows to 520, where it is determined if the timer has elapsed and needs to be reset. In an exemplary embodiment, the timer is reset every 250 ms.

If so, at 522, the timer is reset and the value "Z" is subtracted from the counter. Otherwise, at 524, the process 500 is stalled for a short period of time, for example, 0.5 ms, before the iteration of the process starts again at 506. In this manner, the process 500 factors in a rate of time into the determination of whether to respond or ignore actuator press at steps 514-518.

In an embodiment, the values of X, Y and Z may be determined based on a variety of factors, including but not limited to, the power tool voltage requirements, current rush during braking, current flow during start-up, power switch current ratings, etc. The values of X, Y, Z, and the timer threshold together make up a start-stop frequency threshold above which the tool is temporarily disabled until the power switches 202 are cooled. In an embodiment, where the electronic braking places a higher stress on the power switches 202, the value of Y may be selected to be greater than X. In an example, Y is in the range of 20 to 40, X is in the range of 2 to 5, and Z is 1. This ensures that as long as the actuator is not pressed and released too frequently, the tool continues to function normally.

Some of the techniques described herein may be implemented by one or more computer programs executed by one or more processors, controllers and/or control units residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising:
    a housing;
    a brushless DC (BLDC) motor arranged within the housing, the motor including a stator and a rotor rotatably disposed within the stator;
    a power module electrically disposed between the motor and a power supply, the power module comprising a plurality of power switches;
    an actuator engageable by a user; and
    a control module configured to control a switching operation of the plurality of power switches to begin supply power to the motor when the actuator is engaged,
    wherein the control module is configured to monitor engagement and disengagement events of the actuator, and ignore a subsequent engagement of the actuator if at least one of number of actuator engagement events and/or number of actuator disengagement events exceeds a predetermined threshold value within a predetermined time.

2. The power tool of claim 1, wherein the control module is configured to electronically brake the motor when the actuator is disengaged.

3. The power tool of claim 1, wherein the power module comprises a plurality of high-side and low-side switches configured as a three-phase inverter circuit.

4. The power tool of claim 1, wherein the power tool is a miter saw configured to perform a cutting operation.

5. The power tool of claim 1, wherein the control module is configured to add to a counter upon detection of every engagement and disengagement events of the actuator, and to ignore the subsequent engagement of the actuator if the counter exceeds a predetermined value within the predetermined time.

* * * * *